United States Patent [19]

Shigemoto

[11] Patent Number: 4,546,150

[45] Date of Patent: Oct. 8, 1985

[54] FILM OF POLYMER MIXTURE CONTAINING 4-METHYL-1-PETENE POLYMER

[75] Inventor: Hiromi Shigemoto, Iwakuni, Japan

[73] Assignee: Mitsui Petrochemical Industries, Ltd., Tokyo, Japan

[21] Appl. No.: 634,115

[22] Filed: Jul. 24, 1984

[30] Foreign Application Priority Data

Jul. 26, 1983 [JP] Japan ................................. 58-135226

[51] Int. Cl.$^4$ ...................... C08L 23/20; C08L 23/14
[52] U.S. Cl. .................................................... 525/240
[58] Field of Search ......................................... 525/240

[56] References Cited

U.S. PATENT DOCUMENTS 3,458,604  7/1969  Palmer ................................. 525/240
3,544,662  12/1970  Polestak et al. ..................... 525/240
3,692,712  9/1972  Crouch et al. ....................... 525/240
3,880,952  4/1975  Brackman ............................ 525/240

FOREIGN PATENT DOCUMENTS 53-098353  8/1978  Japan .

Primary Examiner—Carman Seccuro
Attorney, Agent, or Firm—Wenderoth, Lind & Ponack

[57] ABSTRACT

A film composed substantially of a polymer mixture containing a 4-methyl-1-pentene polymer, said polymer mixture comprising (A) the 4-methyl-1-pentene polymer and (B) a copolymer of propylene and an alpha-olefin, the propylene/alpha-olefin copolymer (B) containing 40 to 87 mole % of the propylene component and a heat of crystal fusion of not more than 80 joules/g, and the content of the propylene/alpha-olefin copolymer (B) being 5 to 70% by weight based on the total weight of the 4-methyl-1-pentene polymer (A) and the propylene/alpha-olefin copolymer (B).

12 Claims, No Drawings

FILM OF POLYMER MIXTURE CONTAINING 4-METHYL-1-PETENE POLYMER

This invention relates to a film of a polymer mixture containing a 4-methyl-1-pentene polymer. More specifically, it relates to a film having excellent impact strength.

Poly(4-methyl-1-pentene) by taking advantage of its excellent transparency, heat resistance and chemical resistance, is used as a material for chemical experimental instruments such as beakers or measuring cylinders, an injection syringe, a cell for optical measurement, a tray for an electronic range, a coating on a baking carton, etc.

While poly(4-methyl-1-pentene) has a high melting point and good heat resistance, a film prepared from it has the defect of being inferior in heat sealability.

As a method of improving heat sealability of a polypropylene film, it is well known to add an ethylenic resin such as low-density polyethylene or an ethylene/propylene copolymer. But the inventor found that the addition of such a resin to poly(4-methyl-1-pentene) scarcely results in an improvement in heat sealability and on the contrary, such a resin disperses poorly to reduce the impact strength of the poly(4-methyl-1-pentene).

On the other hand, a thermoplastic resin composition comprising 10 to 95% by weight of a polypropylene resin having high crystallinity, i.e. a homopolymer of propylene or a copolymer of propylene with not more than 10 mole % of an alpha-olefin, and 90 to 5% by weight of crystalline poly(4-methylpentene-1) resin is known (see the specification of Japanese Laid-Open Pat. Publication No. 98353/1978). This patent document, however, gives no disclosure about the properties of a film composed of this thermoplastic resin composition.

It is an object of this invention to provide a film containing a 4-methyl-1-pentene polymer and having excellent heat sealability and impact strength.

Another object of this invention is to provide a film having excellent heat sealability and impact strength and composed of a polymer mixture containing a 4-methyl-1-pentene polymer and a propylene/alpha-olefin copolymer whose crystallinity is not so high.

Further objects and advantages of this invention will become apparent from the following description.

These objects and advantages of this invention are achieved in accordance with this invention by a film composed substantially of a polymer mixture containing a 4-methyl-1-pentene polymer, said polymer mixture comprising (A) the 4-methyl-1-pentene polymer and (B) a copolymer of propylene and an alpha-olefin, the propylene/alpha-olefin copolymer (B) containing 40 to 87 mole % of the propylene component and a heat of crystal fusion of not more than 80 joules/g, and the content of the propylene/alpha-olefin copolymer (B) being 5 to 70% by weight based on the total weight of the 4-methyl-1-pentene polymer (A) and the propylene/alpha-olefin copolymer (B).

The 4-methyl-1-pentene polymer denotes a crystalline homopolymer of 4-methyl-1-pentene or a crystalline copolymer of 4-methyl-1-pentene and another alpha-olefin. Preferably, the crystalline copolymer of of 4-methyl-1-pentene and another alpha-olefin is, for example, a crystalline copolymer comprising at least 85 mole % of 4-methyl-1-pentene. The alpha-olefin may, for example, be an alpha-olefin having 2 to 20 carbon atoms (excepting 4-methyl-1-pentene) such as ethylene, propylene, 1-butene, 1-hexene, 1-octene, 1-decene, 1-tetradecene and 1-octadecene. Of these, 1-decene and 1-octadecene are especially preferred.

The 4-methyl-1-pentene polymer (A) has a melt flow rate (at 260° C. under a load of 5 kg) of preferably 0.5 to 200 g/10 min. If the melt flow rate is less than 0.5 g/10 min., the polymer has a high melt viscosity and tends to have poor moldability. If the melt flow rate exceeds 200 g/10 min., the melt viscosity of the polymer is low and its moldability is poor. Furthermore, its mechanical strength tends to be low. The especially preferred melt flow rate of this polymer is 20 to 80 g/10 min.

The propylene/alpha-olefin copolymer (B) used in this invention has a propylene component content of 40 to 87 mole % and a heat of crystal fusion of not more than 80 joules/g.

If the propylene component content exceeds 87 mole %, the copolymer does not substantially produce an effect of improving heat sealability. On the other hand, if the propylene component content is less than 40 mole %, the dispersibility of the copolymer (B) in the 4-methyl-1-pentene polymer (A) is poor and a film from the resulting polymer mixture has a reduced impact strength.

A copolymer (B) having a heat of crystal fusion exceeding 80 joules/g has a small amount of the alpha-olefin or has the alpha-olefin copolymerized in blocks. It has too high a crystallinity and does not substantially produce an effect of improving heat sealability.

The heat of crystal fusion of the copolymer (B) used in this invention is determined by a differential scanning calorimeter (DSC) using as a base line a straight line which is obtained by directly extrapolating the specific heat curve of the copolymer (B) in the completely molten state to a low temperature side. The measuring conditions are as follows:- The sample is left to stand at 200° C. for 5 minutes, cooled to −40° C. at a rate of 10° C/min., and left to stand at −40° C. for 5 minutes. Then, the temperature is elevated at a rate of 20° C./min, and the measurement is made in the temperature range from −40° C. to 200° C.

Preferably, the copolymer (B) has a propylene component content of 60 to 85 mole %, and a heat of crystal fusion of from 1 to 70 joules/g.

There is no particular restriction on the melt flow rate (MFR: ASTM D 1238, L) of the copolymer (B) used in this invention. If, however, it has an MFR of less than 0.5 g/10 min., the polymer mixture tends to have a high melt viscosity and sometimes does not give a film having a good appearance. On the other hand, if it exceeds 200 g/10 min., the resulting polymer mixture sometimes gives a film having poor mechanical strength. The copolymer (B) has an MFR of preferably 0.5 to 200 g/10 min., more preferably 2 to 50 g/10 min.

Preferably, the copolymer (B) has a microisotacticity (MIT for short) of at least 0.7, especially at least 0.8, and a boiling n-heptane-insoluble content of not more than 5% by weight, especially not more than 3% by weight. If the microisotacticity of the copolymer (B) is less than 0.7, low-molecular-weight substances bleed out on the surface of the film and tend to make the film surface sticky. Large boiling n-heptane-insoluble contents mean large amounts of a component copolymerized in blocks. The use of such a copolymer may sometimes have a reduced effect of improving heat sealability.

The microisotacticity is defined as the fraction of three isotactically arranged propylene components determined by a $^{13}C$. nuclear magnetic resonance spectrum of the copolymer (B) [Macromolecules, Volume 6, page 925 (1973)].

The boiling n-heptane-insoluble content is determined by the following method. A test piece, about 1 mm × 1 mm × 1 mm in size, and glass beads are put in a cylindrical glass filter (G3), and the sample is extracted for 14 hours by a Soxhlet extractor. The reflux frequency at this time is adjusted to about one per 5 minutes. The weight percent of the insoluble portion is obtained by weighing the dissolved portion or the non-dissolved insoluble portion.

The alpha-olefin to be copolymerized with propylene in the copolymer (B) is usually an alpha-olefin having 2 to 10 carbon atoms. Specifically, ethylene, 1-butene, 4-methyl-1-ptentene, 1-hexene, 1-octene and 1-decene are preferably used.

The propylene/alpha-olefin copoymer (B) having a propylene component content of 40 to 87 mole % and having the various properties described above can be obtained by random-copolymerization of propylene and the alpha-olefin using a catalyst formed from (a) a composition at least containing magnesium, titanium and halogen, (b) an organometallic compound of a metal of Groups I to III of the periodic table and (c) an electron donor. A part or the whole of the electron donor (c) may be fixed to a part or the whole of the composition (a). Or prior to use, a part or the whole of the electron donor (c) may be pre-contacted with the organometallic compound (b). In an especially preferred embodiment, a part of the electron donor (c) is fixed to the composition (a), and the remainder is directly added to the polymerization system or used after pre-contacting with the organometallic compound (b). In this case, the electron donor fixed to the composition (a) may be the same as or different from the electron donor to be directly added to the polymerization system or to be used after pre-contacting with the organometallic compound (b).

The catalyst used in the production of the propylene-/alpha-olefin copolymer (B) is known per se, and described, for example in U.S. Pat. Nos. 4,076,924, 4,085,276 and 4,168,361 and British Pat. Nos. 1564460 and 2052534. The disclosures of these patent specifications which relate to catalysts are cited herein as the disclosure of the present specification.

The film of this invention is composed substantially of a polymer mixture comprising the 4-methyl-1-pentene polymer (A) and the propylene/alpha-olefin co-polymer (B). The polymer mixture contains 30 to 95% by weight of the 4-methyl-1-pentene polymer (A) and 70 to 5% by weight of the propylene/alpha-olefin co-polymer (B) based on the total weight of the 4-methyl-1-pentene polymer (A) and the copolymer (B).

If the amount of the copolymer (B) is less than 5% by weight, the heat sealability and impact strength of the film are not substantially improved. On the other hand, if it exceeds 70% by weight, the heat resistance inherent to the 4-methyl-1-pentene polymer is reduced.

Preferably, the film of this invention is composed of a polymer mixture containing 60 to 90% by weight of the 4-methyl-1-pentene polymer and 40 to 10% by weight of the propylene/alpha-olefin copolymer (B).

The film of this invention may be produced by various known methods. For example, the 4-methyl-1-pentene polymer (A) and the propylene/alpha-olefin co-polymer (B) in the amounts described above are mixed by a Henschel mixer, a V-blender, a ribbon blender, a tumbler blender, or the like. The mixture, either as such or after it is melt-kneaded and granulated or pulverized by a single screw extruder, a multiscrew extruder, a kneader, a Banbury mixer, or the like, is fed to an extruder and extruded from a circular die (inflation film forming method) or from a T-die (T-die film forming method).

The polymer mixture may contain in addition to the 4-methyl-1-pentene polymer (A) and the propylene/alpha-olefin copolymer (B) various known additives for polyolefins, such as heat stabilizers, weatherability stabilizers, slipping agents, antiblocking agents, lubricants, nucleating agents, anti-flogging agents, antihaze agents, antistatic agents, pigments, dyes, and inorganic fillers (e.g., barium sulfate, calcium carbonate and talc). These additives are incorporated in the polymer (A) and the copolymer (B) so that they are present at the time of mixing.

The film of this invention may be used as an unstretched film or as a stretched film obtained by stretching it by a known method.

The film composed of the mixture of the 4-methyl-1-pentene polymer (A) and the propylene/alpha-olefin co-polymer (B) in accordance with this invention has excellent impact strength, excellent cold resistance, easy oxygen permeability, high tear strength, high elongation at break and excellent electrical properties in addition to its good low-temperature heat sealability and heat seal strength. Because of these properties, the film of this invention can be used as a packaging film, a film for preserving the freshness of meat, and a condenser film. etc. It can also be conveniently used for retortable foods, baking cartons, mold releasing sheets, etc. by extrusion-coating such a film on paper, cellophane, aluminum foils, polyethylene terephthalate films, nylon films, polypropylene films, polyethylene films, etc. It can also be used as various packaging films by imparting gas permeability resistance by bonding it to an ethylene/vinyl alcohol copolymer film, a vinylidene chloride resin film, etc.

The following examples illustrate the present invention more specifically.

EXAMPLE 1

Sixty percent by weight of poly(4-methyl-1-pentene) (TPX®RT18, a tradename for a product of Mitsui Petrochemical Industries, Ltd.; PMP for short) having an MFR of 26 g/10 min. and 40% by weight of a propylene/1-butene random copolymer (PBR for short) having a propylene content of 71.0 mole %, a melting point of 110° C., a heat of crystal fusion of 50 joules/g, an MFR of 7.0 g/10 min. a boiling n-heptane-insoluble content of 0.5%, a boiling methyl acetate-soluble content of 0.5% and an MIT of 0.94 were mixed by a Henschel mixer, and melt-extruded in an extruder having a screw diameter of 65 mm (set at a temperature of 280° C.). The mixture was extruded through a T-die (set at a temperature of 280° C). The extrudate was cooled at a cooling roll at 60° C. to give an unstretched film having a thickness of 50 microns.

The film was evaluated by the following methods (the same methods apply to subsequent examples).

Haze (%): ASTM D1003
Impact strength (kg-cm/cm): ASTM D3420
Tensile strength: ASTM D638 using a dumbbell-shaped type IV sample at a tensile speed of 50 mm/min.

Heat seal strength (g/15 mm): A film sample is laid over itself, and the overlapping portion is heat-sealed for 1 second under a pressure of 2 kg/cm² at a temperature of 240°, 260° and 280° C. respectively with a seal bar width of 5 mm. A test piece, 15 mm wide, is cut off from this sample, and subjected to a T-peel strength at a peel speed of 200 mm/min.

Heat shrinkage (%): Two indicator lines measuring 100 mm in length, one longitudinally and the other transversely, are marked in a film sample, and the sample is left to stand for 30 minutes in an oven kept at 140° and 180° C. respectively. Then, the distance between the indicator lines is measured, and the percentage of the difference between the distances before and after heat shrinkage based on the distance before heat shrinkage is calculated.
The results are shown in Table 1.

COMPARATIVE EXAMPLES 2 AND 3

Example 1 was repeated except that the proportions of PMP and PBR mixed were changed as shown in Table 1. The results are shown in Table 1.

COMPARATIVE EXAMPLE 4

Example 1 was repeated except that a propylene-/ethylene random copolymer (PER for short) having an MFR of 10 g/10 min., a propylene content of 96.5 mole % and a heat of crystal fusion of 92 joules/g was used instead of PBR. The results are shown in Table 1.

COMPARATIVE EXAMPLE 5

Example 1 was repeated except that an ethylene/1-butene random copolymer (EBR for short) having an ethylene content of 91 mole %, a heat of crystal fusion of 50 joules/g and an MFR of 6 g/10 min. was used instead of PBR. The results are shown in Table 1.

TABLE 1

| Run | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Mixing proportions (wt. %) | PMP/PBR = 60/40 | PMP/PBR = 80/20 | PMP/PER = 60/40 | PMP/PER = 80/20 | PMP = 100 | PMP/PBR = 98/2 | PMP/PBR = 20/80 | PMP/PER = 60/40 | PMP/EBR = 60/40 |
| Thickness (microns) | 50 | 50 | 50 | 50 | 50 | 50 | 50 | 50 | 50 |
| Haze (%) | 25 | 15 | 30 | 20 | 5 | 8 | 35 | 35 | 40 |
| Impact strength (kg-cm/cm) | | | | | | | | | |
| 23° C. | 700 | 500 | 750 | 550 | 30 | 35 | 900 | 35 | 650 |
| 0° C. | 250 | 150 | 550 | 350 | 20 | 25 | 450 | 25 | 500 |
| Tensile modulus (kg/cm²) | 8,000 | 10,500 | 6,000 | 10,000 | 13,000 | 12,500 | 6,500 | 11,280 | 3,800 |
| Tensile strength at break (kg/cm²) | 220 | 260 | 200 | 250 | 300 | 290 | 190 | 240 | 150 |
| Elongation at break (%) | 52 | 35 | 60 | 32 | 25 | 23 | 58 | 24 | 75 |
| Heat seal strength (g/15 mm) | | | | | | | | | |
| 240° C. | 1,000 | 300 | 900 | 750 | 300 | 350 | 700 | 350 | 550 |
| 260° C. | 1,100 | 1,000 | 900 | 950 | 500 | 530 | 700 | 650 | 600 |
| 280° C. | 1,200 | 1,100 | 1,100 | 1,000 | 600 | 650 | 700 | 700 | 650 |
| Heat shrinkage (%) (*) 140° C. MD | 4 | 1 | 5 | 1 | −1 | 0 | 15 | 3 | 6 |
| Heat shrinkage (%) (*) 140° C. TD | 5 | 3 | 6 | 2 | 1 | 1 | 11 | 4 | 7 |
| 180° C. MD | 6 | 3 | 8 | 5 | −2 | 0 | 20 | 4 | 9 |
| 180° C. TD | 3 | 4 | 7 | 8 | 1 | 3 | 18 | 3 | 7 |

(*) MD represents shrinkages in the machine direction, and TD represents shrinkages in a direction at right angles to the machine direction.

EXAMPLE 2

Example 1 was repeated except that the proportions of PMP and PBR were changed as shown in Table 1. The results are shown in Table 1.

EXAMPLES 3 and 4

Example 1 was repeated except that a propylene ethylene random copolymer (PER for short) having a propylene content of 58 mole %, a heat of crystal fusion of 3 joules/g, an MFR of 5 g/10 min., a boiling n-heptane-insoluble content of 0.1%, a boiling methyl acetate-soluble content of 0.8% and an MIT of 0.96 was used instead of PBR, and the proportions of PER and PMP were set as shown in Table 1. The results are shown in Table 1.

COMPARATIVE EXAMPLE 1

Example 1 was repeated except that PMP was used alone. The results are shown in Table 1.

What is claimed is:

1. A film composed substantially of a polymer mixture containing a 4-methyl-1-pentene polymer, said polymer mixture comprising (A) the 4-methyl-1-pentene polymer and (B) a copolymer of propylene and an alpha-olefin, the propylene/alpha-olefin copolymer (B) containing 40 to 87 mole % of the propylene component and a heat of crystal fusion of not more than 80 joules/g, and the content of the propylene/alpha-olefin copolymer (B) being 5 to 70% by weight based on the total weight of the 4-methyl-1-pentene polymer (A) and the propylene/alpha-olefin copolymer (B).

2. The film of claim 1 wherein the 4-methyl-1-pentene polymer is a crystalline homopolymer of 4-methyl-1-pentene.

3. The film of claim 1 wherein the 4-methyl-1-pentene polymer is a crystalline copolymer of at least 85 mole % of 4-methyl-1-pentene and not more than 15 mole % of an alpha-olefin having 2 to 20 carbon atoms.

4. The film of claim 1 wherein the 4-methyl-1-pentene polymer has a melt flow rate of 0.5 to 200 g/10 minutes.

5. The film of claim 1 wherein the propylene/alpha-olefin copolymer contains 60 to 85 mole % of propylene.

6. The film of claim 1 wherein the propylene/alpha-olefin copolymer has a heat of crystal fusion of from 1 to 70 joules/g.

7. The film of claim 1 wherein the propylene/alpha-olefin copolymer has a melt flow rate of 0.5 to 200 g/10 minutes.

8. The film of claim 1 wherein the propylene/alpha-olefin copolymer has a microisotacticity of at least 0.7.

9. The film of claim 1 wherein the propylene/alpha-olefin copolymer has a boiling n-heptane-insoluble content of not more than 5% by weight.

10. The film of claim 1 wherein the content of the propylene/alpha-olefin copolymer is 10 to 40% by weight based on the total weight of the propylene/alpha-olefin copolymer and the 4-methyl-1-pentene polymer.

11. The film of claim 1 wherein the polymer mixture consists substantially of the 4-methyl-1-pentene polymer and the propylene/alpha-olefin copolymer.

12. The film of claim 1 which is non-stretched.

* * * * *